Figure 1:
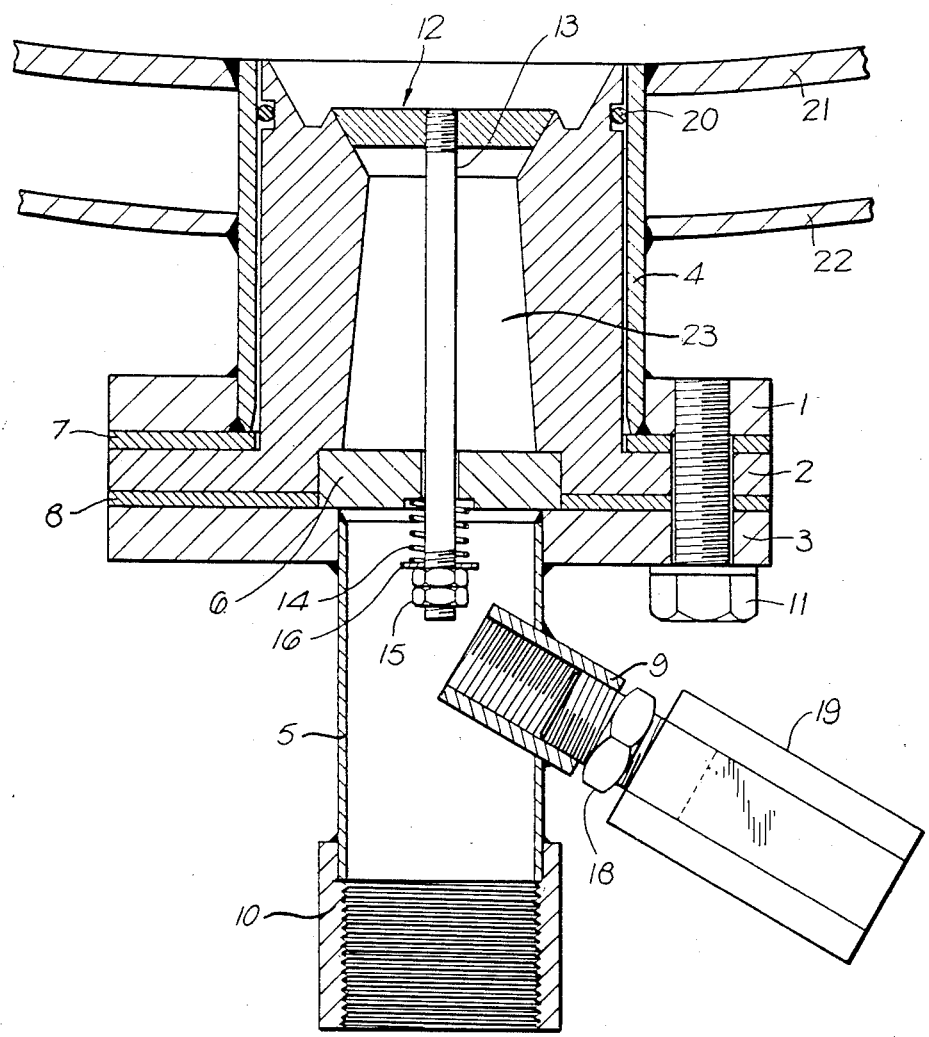

United States Patent [19]

Giusti

[11] Patent Number: 4,559,980

[45] Date of Patent: Dec. 24, 1985

[54] APPARATUS AND A PROCESS FOR INJECTING STEAM DIRECTLY INTO A PRODUCT IN A PROCESSING VESSEL

[75] Inventor: Glyn R. Giusti, London, England

[73] Assignee: T. Giusti & Son Ltd., England

[21] Appl. No.: 486,803

[22] Filed: Apr. 20, 1983

[51] Int. Cl.⁴ .............................................. B65B 3/04
[52] U.S. Cl. ...................................... 141/11; 141/70; 426/510
[58] Field of Search ...................... 426/523, 510, 511; 141/1–12, 37–82

[56] References Cited

U.S. PATENT DOCUMENTS 1,955,289  4/1934  Greenfield ........................ 426/510
2,377,796  6/1945  McKinnis ............................ 141/70
2,519,353  8/1950  Cassady ............................. 141/70

Primary Examiner—Houston S. Bell, Jr.
Attorney, Agent, or Firm—Cantor and Lessler

[57] ABSTRACT

Apparatus and a process for injecting steam directly into a product in a processing vessel are described. The apparatus comprises a steam inlet valve (12, 13) operable under steam pressure to inject stem fed through the valve into a product in a processing vessel. Air inlet means (9) are provided for bleeding air at a predetermined pressure into the steam being fed to the steam inlet valve means, the pressure of the air bled into the steam being such that hammering of the steam in the processing vessel is prevented.

25 Claims, 2 Drawing Figures

APPARATUS AND A PROCESS FOR INJECTING STEAM DIRECTLY INTO A PRODUCT IN A PROCESSING VESSEL

This invention relates to apparatus and a process for injecting steam directly into a product.

A common problem in the processing of products, particularly food products, is the total time required. A variety of methods may be employed for reducing the times of either the heating or cooling cycles of the processing but the problems of speeding heat exchange from the heating medium to the product and preventing the product cooking-on to the walls of the vessel in which the product is being processed are difficult to solve.

Accordingly, where water is used as a phase in the product, it has been proposed to inject steam directly into the product so as to drastically reduce the heating time required and at the same time prevent the product cooking-on to the walls of the vessel because the processing vessel walls and product are at the same temperature.

However, such direct injection of steam into a cold product causes excessive steam hammering which may damage the processing vessel and which in any case makes operation of the process undesirably noisy. In an attempt to obviate this problem, venturi arrangements have been provided to recirculate the product into the injector. However, in such an arrangement, the product must pass through an extremely small orifice, thereby preventing use of the arrangement with any product containing solid particles and making the apparatus difficult to clean.

It is an object of the invention to provide apparatus and a process for injecting steam directly into a product in a processing vessel, while avoiding the difficulties of the previously proposed arrangements.

According to one aspect of the invention there is provided apparatus for injecting steam directly into a product in a processing vessel, comprising steam inlet valve means operable under steam pressure to inject steam fed thereto into a product in a processing vessel and air inlet means for bleeding air at a predetermined pressure into the steam being fed to the steam inlet valve means, the pressure of the air bled into the steam being such that hammering of the steam in the processing vessel is prevented.

According to a second aspect of the invention there is provided a process for injecting steam direcly into a product in a processing vessel, comprising injecting steam under pressure into the product via steam inlet valve means operable under the steam pressure and bleeding air at a predetermined pressure into the steam prior to injection of the steam into the product, the pressure of air bled into the steam being such that steam hammering in the processing vessel is prevented.

Figure 2:
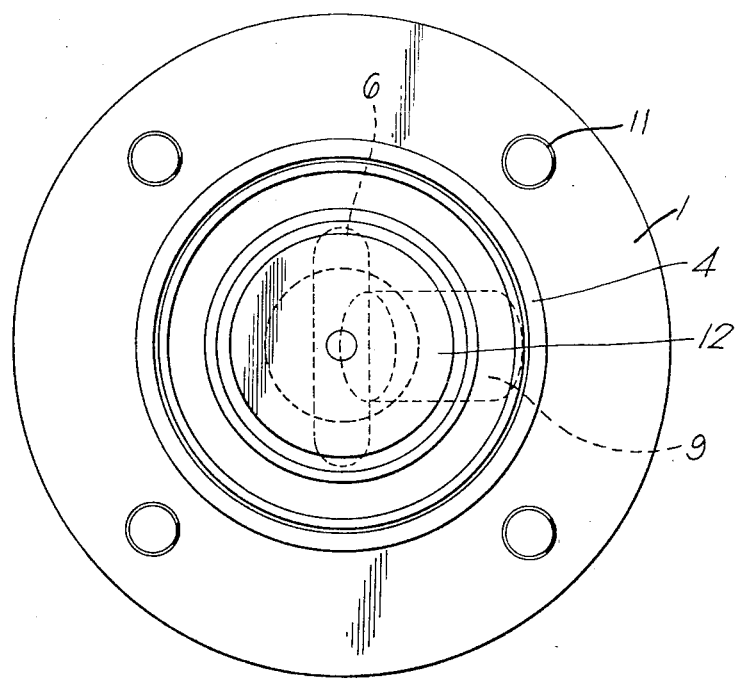

In order that the invention may be more readily understood, an embodiment thereof will now be described, by way of example, with reference to the accompanying drawing, in which:

FIG. 1 is an elevational view partly in cross-section of apparatus embodying the invention connected to an inlet of a steam jacketted processing vessel; and FIG. 2 is a plan view from above of the apparatus of FIG. 1.

Referring now to the drawing and in particular FIG. 1, steam injecting apparatus embodying the invention is attached to a steam jacketted processing vessel by means of a tubular pipe or branch 4 sealingly welded in an opening formed through inner and outer walls 21 and 22 of the processing vessel and an annular flange 1 welded to the free end of the branch 4.

A main body 2 of the steam injecting apparatus is formed with a longitudinally extending bore 23, the ends of the bore 23 being flared outwardly such that the bore has upper and lower frustoconical portions with respect to the processing vessel. The main body 2 is sealed in the branch 4 by means of an O-ring 20 carried by the main body.

The upper frustoconical portion of the bore 23 forms a seat for a frustoconical head 12 of a steam inlet poppet valve which normally closes the end of the bore 23 opening into the processing vessel. The valve head 12 is welded to a valve stem 13 in the form of a solid pipe which extends axially through the bore 23. The valve stem 23 passes with clearance through an aperture formed in a member 6 extending across the lower end of the bore 23 and engaging in recesses formed in the inner walls of the main body 2. The member 6 partially blocks the lower end of the bore 23 and is preferably, as shown, elliptical in cross-section, the major axis of the elipse extending across the lower end of the bore 23.

The end of the valve stem 13 passing through the member 6 extends into a tubular member 5 and is provided with an annular flange or abutting surface 16 retained in place on the valve stem by two lock nuts 15. A compression spring 14 extends between the abutting surface 16 and a recess formed in the member 6 and is arranged to bias the valve head 12 towards the normally closed position of the poppet valve.

The end of the tubular member 5 adjacent the member 6 is welded to a further flange 3 and the main body 2 and tubular member 5 are held in place with respect to the processing vessel by means of bolts 11 extending through aligned apertures formed in the flanges 1 and 3 and in a radially enlarged end of the main body 2. Gaskets 7 and 8 respectively ensure sealing contact between the flange 1 and the main body 2 and between the flange 3 and the main body 2.

The free end of the tubular member 5 is welded to a 1" (2.5 cm) BSP steam inlet pipe 10 for connection to a steam supply via an adjustable steam pressure reducing valve (not shown) with a preferred range of from 5 to 20 psig (3.44 to 13.8×10⁴ Pa) and an on/off valve (not shown).

An air inlet nozzle 9 extends through the wall of the tubular member 5 and is welded in place. The air inlet nozzle 9 is connected by a nut 18 to a non-return valve 19 and a ¼" (0.6 cm) BSP air inlet pipe for connection to a pressurized air supply via an adustable air pressure reducing valve with a preferred range of from 5 to 20 psig (3.44 to 13.8×10⁴ Pa) (not shown) and an on/off valve (not shown).

Normally, the apparatus is fitted to the processing vessel during manufacture. However, the apparatus may be supplied separately and fitted to a processing vessel provided with an inlet having a branch 4 welded therein and a flange 1 connected to the free end of the branch.

Once the apparatus attached to a processing vessel has been connected to both the steam and pressurised air supply, the steam injecting apparatus should be adjusted as follows.

First, the pressure vessel is filled with cold water. It should be noted that initial setting up of the apparatus cannot be carried out at temperatures over 80° C. Ideally water at ambient temperature should be used.

The steam supply to the injecting apparatus is then turned on and the pressure of the steam supply to the reducing valve is adjusted to approximately 10 psig ($6.88 \times 10^4$ Pa) allowing steam to be injected into the water in the processing vessel and causing severe steam hammering in the vessel. Next, ensuring that the air pressure reducing valve is initially turned to the minimum pressure, the air supply is turned on. The pressure of the air bled into the steam being fed into the processing vessel via the poppet valve is then adjusted until the hammering stops and a clear hiss is heard which will usually occur when the air pressure is 1 or 2 psig (6.9 or $13.8 \times 10^3$ Pa) above the steam pressure.

The processing vessel incorporating the steam injecting apparatus is now ready for use and the above described adjustments need not be made again.

The steam injecting apparatus may be used in conjunction with the steam jacket of the processing vessel or may be used separately not only for heating the product but also for simmering or maintaining the product at a particular temperature. Preferably, if the steam injecting apparatus is to be used for controlled temperature processing, the air supply and steam supply to the processing vessel are controlled automatically by means of a remote on/off valve or valves controlled by a signal produced by a temperature probe provided in the processing vessel and by a temperature controller, for example a thermostat, associated with the vessel. If the air and steam supply are to be operated manually, it is recommended that the steam injecting apparatus be used only to attain the required maximum temperature and that the steam jacket be used if it is desired to maintain the product at a given temperature.

Of course, where the steam heated vessel is to be operated under pressure, the necessary vent valve provided on the vessel must of course be open during heating up times to 100° C. Over this temperature range final heating to the required level may be achieved by using the steam jacket only, the steam injecting apparatus or both. Preferably, these operations are undertaken automatically.

It should be noted that the use of steam injection will cause the steam to condense in the product being processed and that the amount of water condensed into the product is easily calculable being a function of the steam pressure, the rate of heating, and the starting and finishing temperatures. Of course, where flash evaporation by vacuum of the product is available for increasing the speed of the cooling cycle, the amount of water added by the steam injecting apparatus will be equal to the amount of water vapour removed under vacuum, provided of course that the process starting and finishing temperatures are similar.

A typical heating up time of 17 minutes is obtained using steam injecting apparatus embodying the invention on a 250 liter batch of product containing a total of 30% by volume of water in the final mixture with a starting temperature of approximately 2° C. and heating through to 100° C. The amount of water condensed in the product is 53 liters. Thus, it will be seen that by adjusting the initial raw material batch to accept less water the difference can easily be catered for.

It should be noted that, for the steam injecting apparatus to operate successfully, the steam should be clean (having preferably been cleaned by filters etc), the boiler producing the steam should be able to work on a "no condensate return" system and most importantly non carcinogenic boiler water inhibitors should be used.

The steam injecting apparatus embodying the invention is normally fully self-cleaning. However, it is advisable that during each cleaning cycle of the processing vessel, a short, for example five minute, burst of steam be passed through the injecting apparatus to ensure sterility. It will of course be understood that, if necessary, the steam injecting apparatus may be dismantled and removed from the processing vessel by undoing the bolts 11.

Extensive research has shown that hammering is generally caused by the collapse of bubbles of steam rapidly when injected into the colder projects and that the mixing of air with the steam before injection into the product ensures that, when the bubble of steam collapses and condenses it is still contained within a bubble of air. At the correct pressure therefore the air prevents steam hammering in the processing vessel and any damage to the material from which the vessel is constructed caused by hammering is also avoided. Thus, the constant flexing of the material of the processing vessel caused by steam hammering and the rapid work-hardening associated therewith are obviated by using apparatus embodying the invention.

Steam injecting apparatus embodying the invention may be used in the food industry in particular and also widely in the pharmaceutical and cosmetic industries.

I claim:

1. Apparatus for injecting steam directly into a product in a processing vessel without hammering comprising:
    (A) a main body fixed to said processing vessel and having a longitudinal bore shaped essentially as a convergent-divergent nozzle, said nozzle having an upper portion having a wall which diverges upwardly and opens into said vessel, and a lower portion which is longer than said upper portion and has a wall which diverges downwardly;
    (B) a tubular member extending from said lower portion of said nozzle;
    (C) an elliptical member seated in the lower end of said main body partially blocking said bore;
    (D) a poppet valve comprising a frustoconical head seated at the upper end of said upper portion of said nozzle, and a valve stem extending through said lower portion of said nozzle and said elliptical member, said poppet valve being normally biased in a closed position;
    (E) means for supplying steam at a predetermined pressure through said tubular member; and
    (F) air inlet means fixed at an upwardly directed angle in the wall of said tubular member to inject air at a predetermined pressure sufficient to prevent steam hammering in said vessel.

2. Apparatus according to claim 1, wherein the poppet valve is biased toward said closed position by spring biasing means.

3. Apparatus according to claim 1 or 2, wherein the air inlet means comprises a nozzle connectable to a pressurized air supply.

4. Apparatus according to claim 3, wherein the air inlet nozzle is connected to the pressurized air supply via a one way valve.

5. Apparatus according to claim 1, wherein means are provided for switching at least one of the air supply and the steam supply on or off.

6. Apparatus according to claim 5, wherein the switching means are operable in response to the required operating conditions.

7. Apparatus according to claim 1, wherein air is supplied to the air inlet means via a pressure reducing valve.

8. Apparatus according to claim 1, wherein steam is supplied to the tubular member via a pressure reducing valve.

9. Apparatus according to claim 1, wherein the steam is injected at a pressure sufficient to overcome the biasing of said poppet valve, said pressure being in the range of from 5 to 20 psig.

10. Apparatus according to claim 9, wherein said air is injected at a pressure of from 5 to 20 psig.

11. A process for injecting steam directly into a product in a processing vessel comprising:
 (A) providing an apparatus which comprises:
  (1) a main body fixed to said processing vessel and having a longitudinal bore shaped essentially as a convergent-divergent nozzle, said nozzle having an upper portion having a wall which diverges upwardly and opens into said vessel, and a lower portion which is longer than said upper portion and has a wall which diverges downwardly;
  (2) a tubular member extending from said lower portion of said nozzle;
  (3) an elliptical member seated in the lower end of said main body partially blocking said bore;
  (4) a poppet valve comprising a frustoconical head seated at the upper end of said upper portion of said nozzle, and a valve stem extending through said lower portion of said nozzle and said elliptical member, said poppet valve being normally biased in a closed position;
  (5) means for supplying steam at a predetermined pressure through said tubular member; and
  (6) air inlet means fixed at an upwardly directed angle in the wall of said tubular member to inject air at a predetermined pressure sufficient to prevent steam hammering in said vessel;
 (B) passing steam through said apparatus to the interior of said vessel at a predetermined pressure; and
 (C) passing air through said air inlet means at a predetermined pressure sufficient to prevent steam hammering in said vessel.

12. A process according to claim 1, wherein the poppet valve is biased toward a closed position by spring biasing means.

13. A process according to claim 11 or 12, wherein the air inlet means comprises a nozzle connectable to a pressurized air supply.

14. A process according to claim 13, wherein the air inlet nozzle is connected to the pressurized air supply via a one way valve.

15. A process according to claim 11, wherein means are provided for switching at least one of the air supply and the steam supply on or off.

16. A process according to claim 15, wherein the switching means are operable in response to the required operating conditions.

17. A process according to claim 11, wherein air is supplied to the air inlet means via a pressure reducing valve.

18. A process according to claim 11, wherein steam is supplied to the tubular member via a pressure reducing valve.

19. A process according to claim 11, wherein the steam is injected at a pressure sufficient to overcome the biasing of said poppet valve, said pressure being in the range of from 5 to 20 psig.

20. A process according to claim 19, wherein said air is injected at a pressure of from 5 to 20 psig.

21. A process according to claim 11, further comprising adjusting the steam and air supplies prior to processing a product, said adjusting comprising the steps of filling said vessel with cold water, turning on the flow of said steam and adjusting the steam pressure to about 10 psig to thereby cause severe hammering, turning on the flow of said air to a minimal pressure, and adjusting the air pressure until the hammering stops.

22. A process according to claim 21, wherein the air pressure, after adjustment, is in the range of 1 to 2 psig over the steam pressure.

23. An apparatus for processing a product with steam but without the occurrence of hammering comprising:
 (A) a processing vessel;
 (B) a main body fixed to said processing vessel and having a longitudinal bore shaped essentially as a convergent-divergent nozzle, said nozzle having an upper portion having a wall which diverges upwardly and opens into said vessel, and a lower portion which is longer than said upper portion and has a wall which diverges downwardly;
 (C) a tubular member extending from said lower portion of said nozzle;
 (D) an elliptical member seated in the lower end of said main body partially blocking said bore;
 (E) a poppet valve comprising a frustoconical head seated at the upper end of said upper portion of said nozzle, and a valve stem extending through said lower portion of said nozzle and said elliptical member, said poppet valve being normally biased in a closed position;
 (F) means for supplying steam at a predetermined pressure through said tubular member; and
 (G) air inlet means fixed at an upwardly directed angle in the wall of said tubular member to inject air at a predetermined pressure sufficient to prevent steam hammering in said vessel.

24. An apparatus according to claim 23, wherein the steam is injected at a pressure sufficient to overcome the biasing of said poppet valve, said pressure being in the range of from 5 to 20 psig.

25. An apparatus according to claim 24, wherein said air is injected at a pressure of from 5 to 20 psig.

* * * * *